United States Patent Office 3,496,156
Patented Feb. 17, 1970

3,496,156
PROCESS FOR PURIFYING POLYOLEFINS
Luciano Luciani, Ferrara, and Piero Manaresi, Bologna, Italy, assignors to Montecatini Edison S.p.A., Milan, Italy, a corporation of Italy
No Drawing. Continuation-in-part of application Ser. No. 400,552, Sept. 30, 1964. This application Jan. 4, 1968, Ser. No. 698,375
Claims priority, application Italy, Oct. 2, 1963, 20,159/63, 706,050
Int. Cl. C08f 1/88
U.S. Cl. 260—93.7                                11 Claims

ABSTRACT OF THE DISCLOSURE

This invention is directed to a process for purifying polyolefins obtained by polymerizing an olefin in the gaseous phase in the presence of a catalytic system comprising a titanium halide and an organo aluminum compound which process comprises treating the crude polymer at a temperature ranging from about 80° C. to 130° C. in the presence of oxygen or an oxygen-containing gas with a mixture having a pH of at least 11 comprising 60–80% by weight of an alkaline solution of an aliphatic alcohol and about 20–40% by weight of a hydrocarbon; said mixture containing about 0.001 to 0.8 gram of water per kg. of the hydrocarbon-alcohol mixture and said hydrocarbon being selected from the group consisting of aliphatic, aromatic and cycloaliphatic hydrocarbons.

---

This application is a continuation-in-part of copending patent application Ser. No. 400,552 filed on Sept. 30, 1964, and now abandoned.

The solid polymers of ethylene and the olefins such as propylene, butene, etc. which are characterized as being linear and having high regularity of structure are obtained by processes utilizing catalytic systems referred to as stereospecific or coordinated catalysts. Polyolefins characterized as being highly crystalline can be obtained by known processes with the aid of stereospecific or coordinated catalytic systems. These systems comprise the reaction product of a transition metal compound and an organo-metallic compound. Generally, the higher stereospecific polymers are obtained with catalytic systems prepared from the reaction of an organo-aluminum compound and a solid crystalline halide of titanium which has a valence lower than its maximum. It is known also that the stability and color of the final product will be substantially impaired if the metal residues resulting from the catalyst are allowed to remain in the polymer. Even the smallest amounts of these metal components have an adverse affect on the characteristics of the polymer.

Accordingly, various methods have been proposed which would eliminate or at least reduce to a minimum the amount of catalytic residues which are normally found in polymers. It is of particular importance to provide a method whereby the residues of titanium can be removed easily, since it appears that these residues particularly have adverse effect on the stability of the polymer. It has been proposed, for example, to purify the polymers by washing them in aqueous and more preferably in alcohol solutions. These washing solutions normally contain basic or acidic compounds which were capable of reacting and/or complexing with the residual metal of the catalyst. In general, it was preferred to use an alcohol which contained an alkaline material, e.g., an alcoholate, to neutralize the acidity which resulted from the decomposition of the catalyst. It has been proposed, for example, to use alcoholic solutions of alcohol amines, either the mono-, di- or tri-amines. The alkalinity of the amines combined with their complexing ability so as to insure complete removal of the metal from the crude polymer.

In considering these methods, however, particular problems have been encountered in the purification of stereoregular alpha-olefin polymers which were prepared by polymerizing the olefin in the gaseous phase. For example, many difficulties were encountered in attempts to purify olefins prepared by the fluidized bed techniques, particularly in those instances where there was no solvent used. This technique utilizes a stereospecific catalyst supported in some preformed polymer. Under these conditions, granules of polymer were obtained which were solid, very compact and substantially non-porous so that it was difficult to wash the product in order to remove the catalyst.

It has now been discovered, quite unexpectedly, that the olefin polymers obtained by polymerizing monomers in the gaseous phase can be purified without any great difficulty. The purification process comprises treating the crude polymer with an alkaline mixture of alcohol in the presence of oxygen or a gas containing oxygen, the mixture having a pH of at least 11. The determination of the pH is carried out by diluting the alkaline methanolic solution with the same volume of distilled water and determining the pH of the diluted solution according to ASTM E70/52T. The alcohol may be a lower aliphatic alcohol containing from 1 to 8 carbon atoms, e.g., ethanol, etc. It was discovered that the metallic residues in the polymer were substantially reduced, thus increasing the stability of the product with respect to oxidation, atmospheric conditions, heat, light, etc. It was necessary, however, to carry out the purification of the polymer with an alkaline alcohol solution containing an aliphatic, cycloaliphatic or aromatic hydrocarbon, e.g. heptane, cyclohexane, benzene, isooctane, toluene, methylcyclopentane, methylcyclohexane etc. In other words, the alcohol content of the mixture may range from about 50–80% and preferably about 70% by weight. Thus, the hydrocarbons may be present in the mixture in amounts ranging from 20–40% by weight and preferably 30% by weight. In addition, it was found that substantial results were obtained by adding to the mixture of alcohol and hydrocarbon a small amount of water and more particularly an amount ranging from 0.5 to 0.8 gram of water per kilogram of the mixture. The crude polymer must be treated with the alcohol mixture at a temperature ranging from about 80° C. to 130° C. This temperature is substantially higher than that normally used for the purification of olefin polymers.

It was surprising to find that, by using a combination of alcohol and hydrocarbon with small amounts of water at higher purification temperatures, it was possible to obtain purified proucts having extremely small amounts of metal residues. The preferred alcohol mixtures contain from about 0.1 to 0.2 gram of water per kg. of mixture. Of the many hydrocarbons, the aromatic hydrocarbons have proven to be the most satisfactory. The amount of hydrocarbon added to the alcohol must be sufficient to insure on the one hand an appreciable amount of swelling of the granules of polymer and on the other hand a complete solubilization of the metal residues by the alcohol, e.g., particularly sodium chloride. The swelling action of the hydrocarbon thus enables the alkaline solution of alcohol to contact the catalytic residues which are to be removed from the polymer. Subsequently, the granules of polymer are washed with a neutral solution of alcohol so as to remove completely any residual metal. If the hydrocarbon, for example, was used in an amount outside of the recommended proportions, it was found that excessive swelling took place which resulted in an incomplete solubilization of the catalytic residues.

In practice, for example, approximately 1 kg. of crude polymer is to be washed at least one time with about 0.1 to 10 liters of the alcohol mixture. The primary treatment or swelling of the polymer and solubilization of the metallic residues are carried out under gas pressure, e.g. 1 to 2 atms., at a temperature of at least 80° C. and preferably at a temperature between 90° C. and 110° C. for a period ranging from about ½ to 8 hours in the presence of oxygen or dry air. The polymer may be washed subsequently at a lower temperature, but the initial washing temperature, for purposes of swelling the particles, must be at least 80° C.

It is also important to utilize an alcohol solution having a pH of at least 11. This basic pH is maintained by using inorganic and/or organic alkaline compounds such as alkali metal compounds. Particularly preferred compounds include the alkali metal alcoholates such as sodium methylate, sodium ethylate, lithium ethylate, sodium isopropylate, sodium salt of monoglyceric acid or of glycolic acid, or NaOH, KOH, diethanolamine, monoethanolamine, etc. This alkaline component is necessary for the purification treatment which solubilizes the aluminum residues. Upon the addition of an aluminum and titanium containing catalyst to an alcohol solution of sodium methylate which is free from oxygen, the formation of a precipitate is observed. However, it was found that while the precipitate containing titanium dissolved immediately in the presence of oxygen at any pH, the precipitate of aluminum on the other hand was not affected by the presence of oxygen but required a high pH value for dissolving. In fact, aluminum presents a solubility gap at a pH of 5–11 but at a pH of 11 or greater the aluminum containing precipitate is completely soluble. In accordance with the process of this invention, it is possible to purify the polymers by removing the aluminum and titanium components to the extent that less than 10 parts per million of titanium and less than 40 parts per million of aluminum remain.

The crude polyolefins, and more particularly polypropylene, purified in the following examples, were obtained by a continuous polymerization process at a pressure of about 4–5 atms. in the gaseous phase in a fluidized bed system. Molecular weight regulators may or may not be used as desired. The average polymerization temperature was about 70° C. with the catalyst being a product obtained by the reaction of aluminum diethylmonochloride and titanium trichloride. The catalyst was continuously charged into the polymerization reactor in admixture with some preformed polymer. The molar ratio of the alkyl aluminum to the titanium halide was about 1:3. The propylene polymer, when compared with the polymers obtained by the solvent phase process, had characteristics which were different, especially with respect to the granulometry.

The following examples are merely given as illustrations of the purification process of this invention.

EXAMPLE 1

About 400 g. of crude polypropylene discharged from the polymerization reactor were treated with about 1200 cc. of a benzene-methanol mixture at room temperature under a pressure of about 2 atms. of dry and purified air. The benzene-methanol mixture contained about 30% by weight of benzene, 0.011% by weight of $H_2O$ and 6 g./l. of sodium methylate ($CH_3ONa$). The polymer to solvent ratio was about 1:3 and the mixture was heated for about 2 hours at 100° C. with agitation.

The product was subsequently rewashed for a period of about 45 minutes with a neutral mixture under a pressure of about 2 atms. of purified air. Here the polymer to solvent ratio was about 1:1.5 kg./l. A third and fourth washing were effected at 55° C. for 30 minutes in the presence of purified air, with a neutral mixture and a polymer/solvent ratio of 1:1.5 kg./l.

The results of this treatment are indicated in Table 1.

TABLE I

| Test No. | Crude Polypropylene, parts per million (p.p.m.) | | Purified Polypropylene, parts per million (p.p.m.) | |
| --- | --- | --- | --- | --- |
| | Aluminum | Titanium | Aluminum | Titanium |
| 1 | 725 | 390 | 60 | 10 |
| 2 | 670 | 240 | 60 | <10 |
| 3 | 670 | 240 | 60 | <10 |
| 4 | 595 | 200 | 40 | <10 |
| 5 | 665 | 275 | 10 | <10 |

EXAMPLE 2

The procedure of Example 1 was repeated except that 1% alcoholic KOH solution was used and a purified polypropylene polymer was obtained which had a residual content of titanium of 10 parts per million and a residual content of aluminum of 30 parts per million.

EXAMPLE 3

A fresh sample of 300 g. of crude polypropylene was charged into an autoclave with about 900 cc. of a heptane-methanol mixture and allowed to react for about 2 hours at 100° C. The heptane-methanol mixture had a water content of about 110 p.p.m. and contained about 30% by weight of heptane and 6 g. of sodium methylate. The alcohol mixture and crude polypropylene were charged into the autoclave under a pressure of 1.5 atms. of purified air. Subsequently, two other washings were carried out with 450 cc. of the heptane-methanol mixture at a temperature of 55° C. for a period of about 45 minutes in the presence of purified air. The crude polymer originally contained about 450 p.p.m. of aluminum and 250 p.p.m. of titanium. The dry, purified polymer, however, only contained 20 p.p.m. of the aluminum and less than 10 p.p.m. of titanium.

The following examples are comparative illustrations wherein the crude polypropylene, as purified in Example 1–3, was treated with an alcohol solution in an alkaline medium with or without the presence of oxygen. It should be particularly noted, however, that in some of these comparative examples the used of a small amount of water and/or of a hydrocarbon solvent was purposely eliminated. In some examples, the operating temperature was lower than that required by the process of this invention. Thus, it can be seen that completely unsatisfactory results were obtained by comparing these examples with Example 1–3 of this invention.

EXAMPLE 4

Approximately 300 to 600 grams of crude polymer just discharged from the polymerization reactor in the gas phase and 900–1800 cc. of methanol were charged into an autoclave under a pressure of 2 atms. of anhydrous and purified air at room temperature. The ratio of polymer to methanol was about 1:3 kg./l. The methanol contained about 6 g. per liter of $CH_3ONa$. The mixture was heated, while stirring, to 100° C., for about 2 hours and then cooled. A large portion of the solvent was removed from the autoclave and neutral methanol was introduced at a ratio of about 1:1.5 kg. per liter. Heating was effected for about 45 minutes at 55° C. in the presence of purified air. The mixture was cooled and the alcohol was removed. A third washing was effected under the same conditions. The alcohol used contained only about 0.12 g. of water per kg.

TABLE II

| Test No. | Crude Polypropylene, parts per million (p.p.m.) | | Purified Polypropylene, parts per million (p.p.m.) | |
|---|---|---|---|---|
| | Aluminum | Titanium | Aluminum | Titanium |
| 1 | 445 | 225 | 335 | 50 |
| 2 | 445 | 225 | 315 | 55 |
| 3 | 1,020 | 350 | 587 | 165 |

It should be noted from an examination of the data in the above table that the use of methanol alone, without hydrocarbon, even at higher temperatures, was not capable of removing the titanium and aluminum compounds to a satisfactory level where a purified polymer could be obtained.

EXAMPLE 5

About 500 g. of crude polypropylene discharged from the reactor and 1500 cc. of anhydrous methanol (containing about 120 p.p.m. of water) were charged into an autoclave at room temperature under a pressure of about 2 atms. of dry and purified air. The alcohol contained about 6 g. per liter of $CH_3ONa$ as the alkaline material. The whole mixture was heated for about 2 hours at 100° C. with stirring and then cooled. The alcohol was removed and the polymer was washed with neutral methanol at 100° C. for a period of 45 minutes. The ratio was about 0.67 kg. of polymer per liter of solvent under 2 atms. of air pressure. Subsequently, two additional washings were carried out at 55° C. for 45 minutes at a ratio of 0.6 kg. of polymer per liter of solvent in the presence of purified and dry air. The results of this treatment are shown in the following table.

TABLE III

| Test No. | Crude Polypropylene, parts per million (p.p.m.) | | Purified Polypropylene, parts per million (p.p.m.) | |
|---|---|---|---|---|
| | Aluminum | Titanium | Aluminum | Titanium |
| 1 | 445 | 225 | 250 | 15 |
| 2 | 445 | 225 | 335 | 45 |
| 3 | 445 | 225 | 310 | 35 |

It should be noted that the use of methanol alone without hydrocarbon, even with two washings at 100° C., was not effective for lowering the values of the titanium and especially of aluminum to satisfactory levels.

EXAMPLE 6

About 500 g. of crude polypropylene and 1750 cc. of methanol which contained approximately 0.2% of water were charged at room temperature into an autoclave under a pressure of about 2 atms. of dry and purified air. The ratio of polymer to methanol used was approximately 1:3.5 kg. of polymer per liter of alcohol. The methanol contained about 4 g. of diethanolamien per liter of alcohol as the alkaline material. The whole mixture was heated for two hours at 100° C. with stirring. The polymer was then washed for the second time with neutral methanol at 100° C. for over 45 minutes with a ratio of about 1:2.2 (kg. of polymer per liter of solvent) in the presence of about 2 atms. of dry and purified air. Subsequently the polymer was washed for the third and fourth time at 55° C. for a period of 45 minutes at a polymer to solvent ratio of 1:2.2 kg./l. in the presence of dry and purified air. The result of the purification treatment is given in the following table.

TABLE IV

| Test No. | Crude Polypropylene, parts per million (p.p.m.) | | Purified Polypropylene, parts per million (p.p.m.) | |
|---|---|---|---|---|
| | Aluminum | Titanium | Aluminum | Titanium |
| 1 | 1,287 | 535 | 730 | 160 |
| 2 | 1,150 | 420 | 525 | 80 |
| 3 | 1,150 | 420 | 412 | 80 |

Thus the values of titanium and aluminum in the purified polymer could not be lowered to satisfactory levels by increasing the amount of alcohol and in the absence of an hydrocarbon or by changing the alkalizing agent.

EXAMPLE 7

About 100 g. of crude polypropylene freshly discharged from the reactor and 300 cc. (240 g.) of a benzene-methonol mixture containing about 30% by weight of benzene were charged into a 500 cc. flask fitted with a stirrer and a reflux condenser. The benzene-methanol mixture also contained sodium methylate in an amount of about 6 g. per liter as the alkaline material. The mixture was heated to 60° C. (incipient boiling) for over 2 hours in the presence of a dry oxygen atmosphere. A solution was taken from the reflux mixture at room temperature and analyzed. The analysis showed that the solution contained about 105 p.p.m. of aluminum and 65 p.p.m. of titanium. Analysis of the crude polymer, however, showed about 630 p.p.m. of aluminum and 255 p.p.m. of titanium. Thus, it is seen by comparing the analysis that, by operating at lower temperatures, only 40% of the aluminum and only 61% of the titanium initially present in the crude polymer were solubilized.

EXAMPLE 8

About 250 g. of crude polymer just discharged from the reactor and 750 cc. of a methanol-benzene mixture were charged into a 1000 cc. flask equipped with a stirrer and reflux condenser. The methanol-benzene mixture contained about 4 g. of diethanolamine per liter. The mixture contained approximately 40% of methanol and 60% of benzene by weight. This particular mixture boils at about 57° C. and it is practically equal to the methanol-benzene azeotrope, which has a boiling temperature of 58.34° C. when 39.55% by weight of methanol is present. Heating was continued for about two hours at 57° C. with agitation. Two additional washings were carried out with the same neutral mixture at 57° C. in the presence of purified air at a polymer/solvent ratio of about 0.67 kg./l. Results of this treatment are as follows:

TABLE V

| Test No. | Crude Polypropylene, parts per million (p.p.m.) | | Purified Polypropylene, parts per million (p.p.m.) | |
|---|---|---|---|---|
| | Aluminum | Titanium | Aluminum | Titanium |
| 1 | 1,212 | 412 | 600 | 70 |
| 2 | 1,212 | 412 | 593 | 80 |
| 3 | 900 | 380 | 462 | 50 |
| 4 | 900 | 380 | 456 | 95 |

Test No. 4 was obtained under the same conditions as tests 1–3 with the exception that 6 g. liter of sodium methylate were used in place of the 4 g. per liter of diethanolamine.

Thus, it is seen from the data of the above table that the values of titanium and aluminum were not lowered to satisfactory levels by increasing the amount of the swelling agent, i.e. benzene, or varying the alkalizing agent and maintaining the lower temperature.

While this invention has been described with respect to a number of specific embodiments, it is obvious that there are many other modifications and variations which can be made without departing from the spirit of the invention.

What is claimed is:

1. A process for purifying a polyolefin obtained by polymerizing an olefin in the gaseous phase in the presence of a catalytic system comprising a titanium halide and an organo aluminum compound, which process comprises treating the crude polymer at a temperature ranging from about 80° C. to 130° C. in the presence of oxygen or an oxygen-containing gas with a mixture having a pH of at least 11 comprising 60–80% by weight of an alkaline solution of an aliphatic alcohol and about 20–40% by weight of a hydrocarbon; said mixture containing about 0.001 to 0.8 gram of water per kg. of the hydrocarbon-alcohol mixture and said hydrocarbon being selected from the group consisting of aliphatic, aromatic and cycloaliphatic hydrocarbons.

2. The process of claim 1 wherein the alkaline solution of alcohol comprises an alkaline compound selected from the group consisting of an alkali metal alcoholate and ethanolamine and a lower aliphatic alcohol selected from the group consisting of methanol and ethanol.

3. The process of claim 1 wherein the polyolefin is polypropylene.

4. The process of claim 2 wherein the lower aliphatic alcohol is methanol.

5. The process of claim 1 wherein the aromatic hydrocarbon is benzene.

6. The process of claim 1 wherein the aliphatic hydrocarbon is heptane.

7. The process of claim 1 wherein the water is present in an amount ranging from about 0.1 to 0.2 g. per kg. of the hydrocarbon-alcohol mixture.

8. The process of claim 1 wherein the crude polymer is treated at a temperature of about 100° C.

9. The process of claim 1 wherein the crude polymer is treated under a pressure of about 2 atmospheres of air.

10. The process of claim 1 wherein the treated polymer is subsequently washed with a neutral solution of alcohol.

11. The process of claim 1 wherein the polyolefin is prepared by polymerizing the olefin in the presence of a catalyst at a temperature of about 70° C., said catalyst comprising $Al(C_2H_5)_2Cl$ and $TiCl_3$ in the molar ratio of 1:3.

References Cited

UNITED STATES PATENTS

| | | |
|---|---|---|
| 2,988,543 | 6/1961 | Meyer. |
| 3,001,976 | 8/1961 | Langer. |
| 3,208,987 | 9/1965 | Reid. |

FOREIGN PATENTS

| | | |
|---|---|---|
| 840,859 | 7/1960 | Great Britain. |
| 1,091,333 | 10/1960 | Germany. |

JOSEPH L. SCHOFER, Primary Examiner

S. M. LEVIN, Assistant Examiner

U.S. Cl. X.R.

260—94.9

PO-1050
(5/69)

UNITED STATES PATENT OFFICE
CERTIFICATE OF CORRECTION

Patent No. 3,496,156      Dated February 17, 1970

Inventor(s) LUCIANO LUCIANI, and PIERO MANARESI

It is certified that error appears in the above-identified patent and that said Letters Patent are hereby corrected as shown below:

Column 2, line 40, "50-" should read -- 60- --; line 47, "0.5" should read -- 0.05 --. Column 4, line 52, "used" should read -- use --. Column 5, line 59, "0.2" should read -- 0.02 --; line 64, "diethanolamien" should read -- diethanolamine --.

SIGNED AND SEALED
JUL 7 1970

(SEAL)
Attest:

Edward M. Fletcher, Jr.
Attesting Officer

WILLIAM E. SCHUYLER, JR.
Commissioner of Patents